United States Patent [19]
Frognet et al.

[11] Patent Number: 5,178,942
[45] Date of Patent: Jan. 12, 1993

[54] MULTI-LAYER OPAQUE FILM STRUCTURES TAILORED TO END-USE REQUIREMENTS

[75] Inventors: Jean-Pierre Frognet, Virton; Lajos E. Keller, Limpertsberg, both of Belgium; Maurice Petitjean, Willers, France

[73] Assignee: Mobil Oil Corporation, Fairfax, Va.

[21] Appl. No.: 756,638

[22] Filed: Sep. 9, 1991

[51] Int. Cl.$^5$ .............................................. B32B 3/26
[52] U.S. Cl. ................................. 428/317.9; 156/229; 264/210.7; 428/313.3; 428/315.5; 428/315.9; 428/516
[58] Field of Search ............... 428/313.3, 313.5, 313.9, 428/315.5, 315.7, 315.9, 317.9, 516; 156/229; 264/210.7

[56] References Cited

U.S. PATENT DOCUMENTS

| | | | |
|---|---|---|---|
| 3,697,367 | 10/1972 | Schwarz et al. | 428/398 |
| 3,795,720 | 3/1974 | Schwarz et al. | 521/138 |
| 4,118,438 | 10/1978 | Matsui et al. | 428/338 |
| 4,377,616 | 3/1983 | Ashcraft et al. | 428/213 |
| 4,632,869 | 12/1986 | Park et al. | 428/317.9 |
| 4,652,489 | 3/1987 | Crass et al. | 428/337 |
| 4,741,950 | 5/1988 | Liu et al. | 428/315.5 |
| 4,758,462 | 7/1988 | Park et al. | 428/213 |
| 5,091,236 | 2/1992 | Keller et al. | 428/317.9 |

Primary Examiner—William J. Van Balen
Attorney, Agent, or Firm—Alexander J. McKillop; Charles J. Speciale; Michael J. Mlotkowski

[57] ABSTRACT

An opaque, biaxially oriented polymeric film structure, produced by orienting the film to a degree which provides low light transmission and improved machinability. The film structure includes a thermoplastic polymer matrix core layer having a first surface and a second surface, within which is located a strata of voids; positioned at least substantially within a substantial number of the voids is at least one spherical void-initiating particle which is phase distinct and incompatible with the matrix material, the void space occupied by the particle being substantially less than the volume of the void; the population of the voids in the core being such as to cause a significant degree of opacity, the core layer including a light absorbing pigment of lamellar morphology; a first non-voided thermoplastic polymer intermediate layer having a first surface and a second surface, the second surface of the first intermediate layer adhering to the first surface of the core layer; and a second non-voided thermoplastic polymer intermediate layer having a first surface and a second surface, the second surface of the second intermediate layer adhering to the second surface of the core layer; wherein the level of light transmission of the film is less than 10% and the degree of orientation is about 8 TDO by less than about 5 MDO.

20 Claims, 1 Drawing Sheet

MULTI-LAYER OPAQUE FILM STRUCTURES TAILORED TO END-USE REQUIREMENTS

FIELD OF THE INVENTION

This invention relates to the field of polymer films of enhanced opacity and to a method of making such films. More particularly, the invention relates to a biaxially oriented composite film structure having improved properties.

BACKGROUND OF THE INVENTION

In the packaging of certain types of foods, such as snack foods like potato chips, cookies and the like, it is common practice to employ a multi-layer film. A desirable property in such a packaging film is an opacity which protects the packaging product from deterioration caused by exposure to light. In particular, it has been found that certain wavelengths of light, up to about 450 nm cause increased spoilage in such packaged products. Even when a degree of opacity is present in the film, spoilage occurs if the film allows passage of some light.

It is known in the art that thermoplastic polymers can be loaded with inert fillers, cast into films, and thereafter stretched to form oriented thermoplastic films. While this statement is generally true, it must be realized that the particular components employed and the specific process parameters employed, particularly when control is difficult, can result in significantly different end products or contribute to the success or failure of obtaining a desired result. As an example, U.S. Pat. No. 4,118,438, discloses the use of some materials similar to those contemplated by the present invention, however, the object of U.S. Pat. No. 4,118,438 is diametrically opposed to the object of the present invention. U.S. Pat. No. 4,118,438 is concerned with a transparent polypropylene film containing fine particles of an incompatible polymer dispersed therein. The film disclosed exhibits surface projections caused by the dispersed particles and the patentees maintain that this gives the transparent film non-blocking characteristics. In U.S. Pat. Nos. 3,697,367 and 3,795,720, there is disclosed a process for preparing an uniaxially oriented mixed polymer system. The resulting material has utility as a paper substitute and can be formed into fibers for making sheet paper.

Oriented opaque film compositions are known in the art. U.S. Pat. No. 4,377,616 discloses an opaque biaxially oriented polymer film structure comprising a thermoplastic polymer matrix core possessing numerous voids, a substantial number of which contain at least one spherical void-initiating particle, and transparent thermoplastic skin layers adhering to the surfaces of the core layer. The unique structure of the core layer imparts a much higher degree of opacity, possibly due to the effects of light scattering, than that possible from the use of an opacifying pigment alone. In U.S. Pat. No. 4,377,616, the film is prepared by melting a mixture of a major proportion of a film forming polymer such as polypropylene and a minor proportion of an incompatible polymer which has a higher melting point, at a temperature sufficient to melt the incompatible polymer and to dispense it in the film forming polymer, extruding the mixture into a film and biaxially orienting the film. The dispersed incompatible polymer provides sites for the formation of voids surrounding the polymer particles. These voids provide opacity and give the film an attractive pearlescent sheen.

U.S. Pat. No. 4,632,869 discloses an opaque, biaxially oriented film structure having a polymer matrix with a strata of voids, the voids containing spherical void-initiating particles of polybutylene terephthalate. The structure may also include thermoplastic skin layers and the film can include from about 1% to 3% b weight of a pigment such as $TiO_2$ or colored oxides.

U.S. Pat. No. 4,758,462 also discloses an opaque, biaxially oriented film with a cavitated core and transparent skin layers. Colored light absorbing pigments such as carbon black or iron oxide are added to the core and/or the skins in an amount of about 2 to 12 weight % to decrease light transmission through the film.

U.S. Pat. No. 4,652,489 discloses an oriented, sealable, opaque polyolefin multi-layer film with a core layer containing vacuoles, a sealable surface layer, and a non-sealable surface layer which incorporates a slip agent such as a polydiorganosiloxane.

U.S. Pat. No. 4,741,950 discloses a differential opaque polymer film with a core layer containing numerous microscopic voids, a rough-appearing wettable first skin layer which contains an antiblocking agent such as silica, silicate, clay, diatomaceous earth, talc and glass, and a second wettable skin layer with a smooth appearance which may be metallized. $TiO_2$ may be present in the core and/or first skin layer. The film allows a light transmission of 24%.

U.S. application Ser. No. 07/324,134, a co-inventor of which is also the inventor of the present invention, discloses a non-symmetrically layered, highly opaque, biaxially oriented polymer film with a core containing numerous microscopic voids and at least about 1% by weight of opacifying compounds; a first skin layer on one surface of the core containing up to about 12% by weight of inorganic particulate material; and a second skin layer on the other surface of the core. U.S. application Ser. No. 07/324,134, also discloses the benefit which accrues from the addition of inorganic particles such as titanium dioxide to whiten the surface of the outer skin layer of the film structure. The increase in whiteness yields an excellent surface for printed graphics. A further benefit resulting from increased whiteness in the outer skin layer of the film is that it permits the printing of laminated or unlaminated film structures without the need for while ink, offering a significant savings to the end user.

While films which employ titanium dioxide-whitened outer skin layers provide the aforementioned benefits, such films can also yield certain undesirable characteristics. These characteristics stem from the fact that titanium dioxide ($TiO_2$) is quite abrasive and, when present on the surface of a film, may result in excessive wear of expensive printing and coating gravure roll surfaces, as well as any other surface which is contacted by such a film. Another problem which arises from the use of $TiO_2$ in the outer skin layers of such films is that fine deposits are laid on converting machinery, extruder die lips, treater bar exhausts, etc. Also, appearance problems caused by streaks on the film slippage on stretching either by roll or tentering can result.

U.S. application Ser. No. 07/699,864, now U.S. Pat. No. 5,091,236, the inventors of which are also the inventors of the present invention, discloses multi-layer opaque, biaxially oriented polymeric film structures which avoid the problems associated with films employing titanium dioxide-whitened outer skin layers.

The film structures disclosed include (a) a thermoplastic polymer matrix core layer having a first surface and a second surface, within which is located a strata of voids; positioned at least substantially within a substantial number of the voids is at least one spherical void-initiating particle which is phase distinct and incompatible with the matrix material, the void space occupied by the particle being substantially less than the volume of the void, with one generally cross-sectional dimension of the particle at least approximating a corresponding cross-sectional dimension of the void; the population of the voids in the core being such as to cause a significant degree of opacity; (b) at least one thermoplastic polymer intermediate layer having a first surface and a second surface, the second surface of the intermediate layer adhering to at least the first surface of the core layer, the intermediate layer including up to about 12% by weight of titanium dioxide contact pigment; and (c) a titanium dioxide-free, non-voided thermoplastic skin layer adhering to the first surface of the intermediate layer, the void-free skin layer and the intermediate layer together being of a thickness such that the outer surface of the skin core layer does not, at least substantially, manifest the surface irregularities of the matrix core layer. U.S. application Ser. No. 07/699,864 is hereby incorporated by reference in its entirety for all that it discloses.

Despite these significant advances in the art, many of the films described within the above-referenced patent literature prove to be somewhat fragile in certain end-use applications. While highly cavitated or voided films are ideally suited for certain applications, such as overwrapping biscuits and the like, in other applications such as those employing Vertical Form Fill and Seal (VFFS) packaging machinery, as well as some which employ Horizontal Form Fill and Seal (HFFS) machinery, the forming collars of the machine often damage or shear the package being formed and filled. In addition, films converted into packages which are filled with both product and air, so as to provide an air cushion for product protection, often benefit from the use of a less fragile film. However certain means employed to provide a less fragile voided film can reduce the film's pleasing aesthetic appearance or may change the ability of the film to inhibit the transmission of light therethrough.

Therefore, what is needed is a less fragile, opaque film structure which provides an improved range of machining operability, while maintaining its appearance characteristics, strength and stiffness and a process for the production of such a film structure.

SUMMARY OF THE INVENTION

The film structure of the present invention is an opaque, biaxially oriented polymeric film structure produced by orienting the film to a degree which provides low light transmission and improved machinability. The film structure includes (a) a thermoplastic polymer matrix core layer having a first surface and a second surface, within which is located a strata of voids; positioned at least substantially within a substantial number of the voids is at least one spherical void-initiating particle which is phase distinct and incompatible with the matrix material, the void space occupied by the particle being substantially less than the volume of the void, the population of the voids in the core being such as to cause a significant degree of opacity, the core layer including a light absorbing pigment of lamellar morphology, (b) a first non-voided thermoplastic polymer intermediate layer having a first surface and a second surface, the second surface of the first intermediate layer adhering to the first surface of the core layer, and (c) a second non-voided thermoplastic polymer intermediate layer having a first surface and a second surface, the second surface of the second intermediate layer adhering to the second surface of the core layer, wherein the level of light transmission of the film is less than 10% and the degree of orientation is about 8 TDO by less than about 5 MDO.

More preferred is a five-layer film structure, incorporating the above-described (a), (b) and (c) layers, and further including (d) a first non-voided thermoplastic skin layer adhering to said first surface of said first intermediate layer; and (e) a second non-voided thermoplastic skin layer adhering to said first surface of said second intermediate layer, the void-free skin layers being of a thickness such that the outer surface of the skin layers do not, at least substantially, manifest the surface irregularities of the matrix core layer.

The skin layers (d) and/or (e) can be simple, economical thin encapsulating layers or they can be more elaborate heat sealable layers.

Also provided is a process for preparing an opaque, biaxially oriented polymeric film structure of low light transmission and improved machinability, comprising the steps of: (a) mixing a major proportion of a first thermoplastic polymeric material with a minor proportion of a first material of higher melting point or having a higher glass transition temperature than the first thermoplastic polymeric material to produce a core layer mixture and a minor amount of a light absorbing pigment of lamellar morphology; (b) heating the core layer mixture produced in step (a) to a temperature of at least above the melting point of the first thermoplastic polymeric material; (c) dispersing the first material of higher melting point or higher glass transition temperature of the mixture produced in step (a) uniformly throughout the molten first thermoplastic polymeric material in the form of microspheres; (d) mixing a second thermoplastic polymeric material to produce a first intermediate layer mixture; (e) heating the intermediate layer mixture produced in step (d) to a temperature of about the melting point of the second thermoplastic polymeric material; (f) mixing a third thermoplastic polymeric material to produce a second intermediate layer mixture; (g) heating the second intermediate layer mixture produced in step (f) to a temperature of about the melting point of the second thermoplastic polymeric material; and (h) forming a biaxially oriented coextruded film structure from the core layer mixture, the first intermediate layer mixture and the second intermediate layer mixture, the forming step conducted at a temperature and to a degree to form a strata of opacifying voids within the core layer; wherein the degree of orientation is about 8 TDO by less than about 5 MDO.

Accordingly, it is an object of the present invention to provide a film structure of high opacity.

It is another object of the present invention to provide a film with improved processing characteristics.

It is a further object of the present invention to provide a film structure having an improved range of machinability.

It is yet another object of the present invention to provide a film which may be bonded to a wide variety of substrates and coating.

It is a yet further object of the present invention to provide a multi-layer film structure of pleasing appearance which does not contribute to operability problems caused by highly fragile films.

Other objects and the several advantages of the present invention will become apparent to those skilled in the art upon a reading of the specification and the claims appended thereto.

DETAILED DESCRIPTION OF THE INVENTION

In order to achieve the unique film structure of the present invention, it is important that a particular thickness relationship exist between the thickness dimension of the core and the thickness of the skin layers. It is preferred that the core thickness be from about 60 to about 95% of the overall structure with about 65-90% preferred. This in combination with the population and configuration of the voids in a total structure of at least about 1.0 mil thick, will materially contribute to the overall degree of opacity of the structure. Likewise, by maintaining the thickness of the skin layers within particular ranges in relation to the overall structure and to the thickness of the core layer, the overall combination results in unique advantages. Intermediate layer (b), adhering to the first surface of core layer (a) and intermediate layer (c) adhering to the second surface of core layer (a) each have a thickness of from about 5 to about 30% of the overall structure, with a thickness of about 5 to about 15% preferred. Intermediate layers (b) and (c) are formed from a thermoplastic polymer and either or both may include a migratory slip agent and a migratory antistatic agent, when encapsulating skin layers (d) and (e) are employed, as will be described in more detail hereinbelow. Once such a five layer structure is formed, the slip and antistatic agents migrate to the outer surface of skin layers (d) and/or (e) to reduce the surface coefficients of friction thereof. The intermediate layer serves an important function in reducing water vapor transmission rate (WVTR) and may also contain $TiO_2$ as a contact whitening agent. Skin layers (d) and (e), which preferably are $TiO_2$-free, adhering to the surfaces of the intermediate layers not in contact with the core layer, have thicknesses of from about 0.10% to about 5.0% of the overall structure with thicknesses of from about 0.20% to about 3.0% preferred. The relative thinness of this layer adds to economy in production especially when the layer is an expensive heat-sealable material. A preferred five-layer structure might include, for example, a core layer with a thickness of about 75% of the overall structure with intermediate layer (b) and (d) having thicknesses of about 10% each and skin layers (c) and (e) having thicknesses of about 2.5% each.

The core is a thermoplastic polymer matrix material within which is located strata of voids. From this it is to be understood that the voids create the matrix configuration.

The films of the present invention have high opacity and low light transmission. A distinction should be made between opacity and light transmission. Opacity is the opposite of transparency and is a function of the scattering and reflection of light transmitted through the film. Opacity is the ability, for example, to block out writing below it. Light transmission is a function of light passing more directly through the film.

Figure 1:
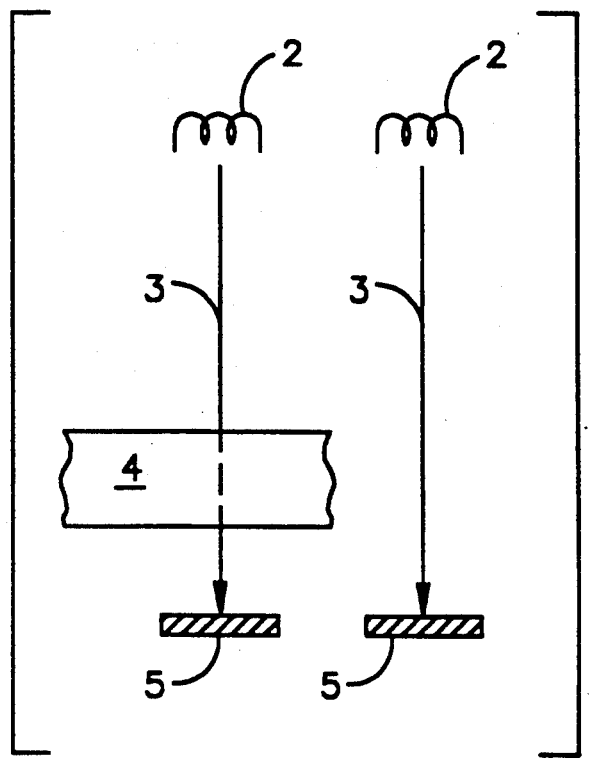
FIG. 1 is a schematic diagram of a method for determining percent light transmission.

Referring now to FIG. 1, the percent light transmission through a film is determined by using light source 2 to transmit light rays 3 directly through film 4 and measuring at light sensor 5, value $T_2$ which is the amount of light which is transmitted through film 4. The amount of light rays 3 which can be directly transmitted, value $T_1$, is determined by measuring the light 3 directly transmitted by light source 2 with no intervening film. The percent light transmission through the film can then be determined using the formula:

$$\% \text{ Light Transmission} = \frac{T_2}{T_1}$$

where: $T_2$=light transmitted through a film; and $T_1$=light directly transmitted.

Figure 2:
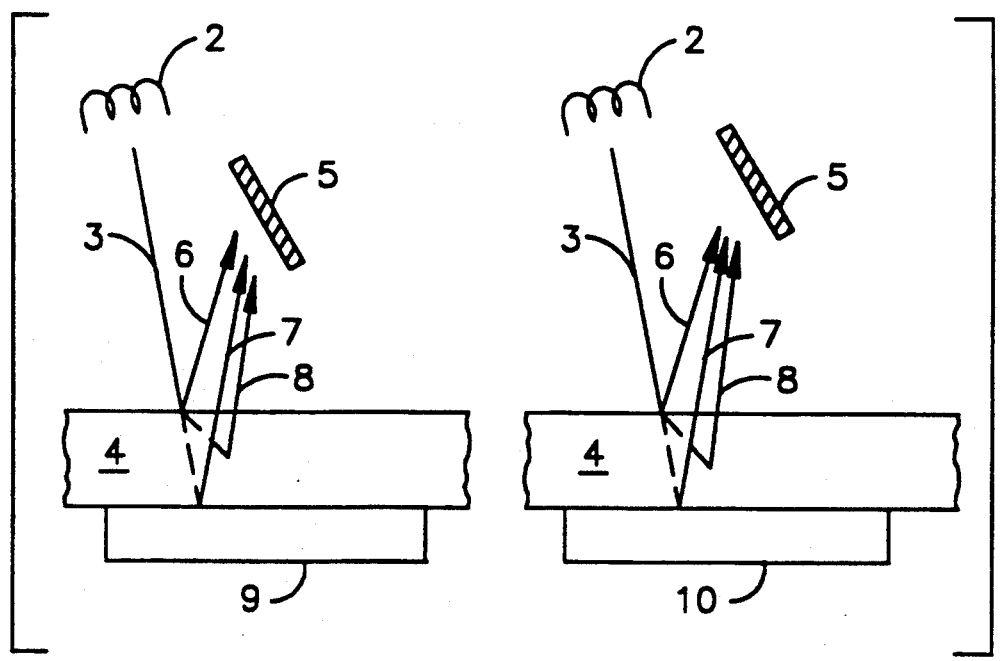
FIG. 2 is a schematic diagram of a method for determining percent opacity.

Referring now to FIG. 2, for a measure of percent opacity of a film, light source 2 transmits light through film 4 onto a white surface 9 and the same procedure used to project light onto a black surface 10. With both white and black surfaces, measurement at light sensor 5 is of all of the following: light reflected off the upper surface of the film 6; light transmitted through the film and reflected by the white or black surfaces 7 on the side of the film opposite from the light source; and, light scattered by the film 8.

The percent opacity of the film can then be determined using the formula:

$$\% \text{ Opacity} = 100 \times \frac{R_B}{R_W}$$

where: $R_W$=Reflected light+scattered light+light transmitted through the film and reflected off a white surface; and $R_B$=Reflected light+scattered light+light transmitted through the film and reflected off a black surface.

Accordingly, a highly reflective film may provide high opacity while allowing light transmission. This is because percent light transmission is not the equivalent to percent opacity. Light transmission is the amount of light passing directly through the film. To prevent food spoilage decreased light transmission is desirable.

In forming the core layer, as in U.S. Pat. No. 4,377,616, the disclosure of which is incorporated herein by reference in its entirety, a master batch technique can be employed by either in the case of forming the void initiating particles in situ or in adding preformed spheres to a molten thermoplastic matrix material. After the formation of a master batch, appropriate dilution of the system can be made by adding additional thermoplastic matrix material until the desired proportions are obtained. However, the components may also be directly mixed and extruded instead of utilizing a master batch method.

The void-initiating particles which are added as filler to the polymer matrix material of the core layer can be any suitable organic or inorganic material which is incompatible with the core material at the temperature of biaxial orientation such as polybutylene terephthalate, nylon, solid or hollow preformed glass spheres, metal beads or spheres, ceramic spheres, calcium carbonate, etc.

The polyolefin contemplated as the core material includes polypropylene, polyethylene, polybutene and copolymers and blends thereof. Particularly preferred is an isotactic polypropylene containing at least about 80% by weight of isotactic polypropylene. It is also preferred that the polypropylene have a melt flow index of from about 2 to 10 g/10 min.

It is preferred that the average diameter of the void-initiating particles be from about 0.1 to about 10 microns. These particles may be of any desired shape although it is preferred that they be substantially spherical in shape. This does not mean that every void is the same size. IT means that, generally speaking, each void tends to be of like shape when like particles are used even though they vary in dimensions. These voids may assume a shape defined by two opposed and edge contacting concave disks.

Experience has shown that optimum characteristics of opacity and appearance are obtained when the two average major void dimensions are greater than about 30 microns.

The void-initiating particle material, as indicated above, should be incompatible with the core material, at least at the temperature of biaxial orientation.

The core has been described above as being a thermoplastic polymer matrix material within which is located a strata of voids. From this it is to be understood that the voids create the matrix configuration. The term "strata" is intended to convey the understanding that there are many voids creating the matrix and the voids themselves are oriented so that the two major dimensions are aligned in correspondence with the direction of orientation of the polymeric film structure. After each void has been formed through the initiation of the described particle, the particle generally contributes little else to the system. This is because its refractive index can be close enough to the matrix material that it makes no contribution to opacity. When this is the case, the opacity is principally a function of the light scattering effect which occurs because of the existence of the voids in the system.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core be major dimensions in comparison to the Z dimension. Thus, while the Z dimension generally approximates the cross-sectional dimension of the spherical particle initiating the void, X and Y dimensions must be significantly greater.

By way of illustration, room temperature biaxial orientation of a polypropylene matrix containing polybutylene terephthalate (PBT) spheres of the size and amount contemplated herein, could not produce the claimed structure. Either void splitting will occur, or, voids of insignificant size would result. Polypropylene must be oriented at a temperature significantly higher than its glass transition temperature. The temperature conditions must permit X and Y to be at least several multiples of the Z dimension without void splitting at least to any significant degree. If this is accomplished, optimum physical characteristics, including low water vapor transmission rates and a high degree of light scattering are obtained without void splitting or film fibrillating.

As indicated above, the matrix polymer and the void initiating particle must be incompatible and this term is used in the sense that the materials are two distinct phases. The spherical void initiating particles constitute a dispersed phase through the lower melting polymer which polymer will, ultimately, upon orientation, become a void-filled matrix with the spherical particles positioned somewhere in the voids.

As a result of the biaxial orientation of the film structure herein, in addition to opacifying the core layer of the structure, the orientation improves other physical properties of the composite layers such as flex-crack resistance, Elmendorff tear strength, elongation, tensile strength, impact strength and cold strength properties. The resulting film can have, in addition to a rich high quality appearance and excellent opacifying characteristics, low water vapor transmission rate characteristics and low oxygen transmission rate characteristics. This makes the film ideally suited for packaging food products including liquids. The film also has attractive utility as a decorative wrap material.

It is believed that because of comparative sphericity of the void-initiating particles, the voids are closed cells. This means that there is virtually no path open from one side of the core the other throughout which liquid or gas can transverse.

The opacity and low light transmission of the film may be further enhanced by the addition to the core layer of from about 1% by weight and up to about 10% by weight of opacifying compounds, which are added to the melt mixture of the core layer before extrusion. Opacifying compounds which may be used include iron oxides, carbon black, aluminum, $TiO_2$, and talc. The opacifying compounds do not contribute to void formation.

Preferred for use in the core layer are pigment particles of a lamellar morphology. The pigment particles of lamellar morphology (lamellar pigment) may comprise an organic pigment, preferably graphite, or an inorganic pigment, such as a silicate, preferably a silicate which has a pronounced tendency to cleave in one preferred planar direction, for example, a mica. Graphite is a particularly preferred lamellar pigment. The lamellar pigment should have an average particle size which, of itself, is insufficient to cause voiding of the matrix; this will depend on the nature of the matrix and the processing conditions, especially deformation temperature and the amount of the pigment in the matrix. The term "voiding of the matrix" as used herein designates creating a space within the matrix. However, good results are obtained when the lamellar pigment has an average particle size from 0.2 to 2.0 micrometers, preferably from 0.5 to 1.0 micrometers. The lamellar pigment may be present in an amount from 0.2 to 12 wt. %, suitably from 0.5 to 5.0 wt % of the film preferably from 1.0 to 2.0 wt. % of the film.

The polyolefin contemplated as the material for use in forming intermediate layers (b) and (c) includes polypropylene, polyethylene, polybutene and copolymers and blends thereof. As was the case for the core layer, particularly preferred is an isotactic polypropylene containing at least about 80% by weight of isotactic polypropylene. It is also preferred that the polypropylene have a melt flow index of from about 2 to 10 g/10 m.

To reduced the coefficient of friction at the surface of the skin layer or layers, the use of certain slip agents in conjunction with certain antistatic agents in the intermediate layer, when each such agent possesses migratory properties, can be employed. Sufficient aging time must be provided to permit the combination of agents to migrate to the outer surfaces of the film. By "migratory" is meant the property or trait of bleeding through the polymeric matrices of the intermediate and skin layers so at least an effective amount of the agents reside on the surface of the skin layer to reduce the surface coefficient of friction thereof.

While a variety of migratory antistatic agents are available commercially, preferred for use in the practice of the present invention is the group of ethoxylated amines and ethoxylated amides. Ethoxylated amines are available from the Humco Chemical Division of Whitco Chemical Corp. under the trademark of Kemamine®, from the Noury Chemical Company under the trademark of Armostat® and from other sources. Ethoxylated amides are available from Akzo Chemie America under the trademark of Ethmid®, from the Oxynol Chemical Company under the tradename of Oxynol® and from other sources. Particularly preferred for their migratory properties is the group of ethoxylated amines.

Likewise, a wide variety of migratory slip agents are available commercially, some of which are disclosed in U.S. Pat. No. 4,510,281, the contents of which are hereby incorporated by reference for those details. Preferred for use in the practice of the present invention is the group of commercially available amine- and amide-based slip agents, with erucamide being most particularly preferred.

The range of antistatic agent levels useful in the practice of the present invention is from about 500 ppm to about 2000 ppm of the intermediate layer mixture, with about 1000 ppm to about 1500 ppm being particularly preferred. It is important to note that when the multi-layer films of the present invention are to come in contact with foods, governmental regulatory agencies generally limit the amount of additives materials which can be employed therein. For example, amine- and amide-based antistatic materials are limited to approximately 1200 ppm of the intermediate layer mixture. Nevertheless, this limitation does not inhibit the ability of the agent to cooperate with the migratory slip agent to yield the beneficial properties ascribed thereto. The range of slip agent levels useful in the practice of the present invention is from about 200 ppm to about 2000 ppm of the intermediate layer mixture, with about 800 ppm to about 1500 ppm being particularly preferred. For example, when seeking to form a 0.8 mil thickness multi-layer structure, in accordance with the present invention, about 1500 ppm of erucamide is required. When forming a 1.6 mil thickness structure, about 800 ppm of erucamide is required. Amine- and amide-based slip agents, such as the most particularly preferred agent, erucamide, are permitted by governmental regulatory agencies to be present at significantly higher levels than necessary to perform the function intended by the present invention.

It has been discovered that the combined use of a migratory antistatic agent with a migratory slip agent results in a synergistic reduction in the coefficient of friction. It is thought that this occurs due to the fact that a film having poor slip characteristics will tend to generate and store more static charges and a film having a high level of stored static charge will tend to cling more to any surface with which it comes in contact with, thus exhibiting a higher coefficient of friction.

Moreover, it has been discovered that the placement of the migratory slip agent and the migratory antistatic agent in the intermediate layers (b) and (c) produces a much higher level of effectiveness than can be achieved through their placement within the core layer (a) or the skin layers (d) and (e). With regard to the placement of the agents in the core layer, this is due to the fact that the migratory slip agent and the migratory antistatic agent will tend to cling to the interior surfaces of the voids formed within the core layer. With regard to the placement of the agents in the skin layer or layers, it is the volatile nature of the agents themselves which tend to limit their effectiveness. As described herein, the temperatures required to form the multi-layer structures of the present invention will tend to "boil" away the agents, inhibiting their ability to function as intended.

The opacity, whiteness and low light transmission of the film may be further enhanced by the addition to intermediate layers (b) and (c) of $TiO_2$ in amount of from about 1% by weight and up to about 10% by weight, which is added to the melt mixture of the intermediate layer before extrusion. Preferably, the intermediate layers contain from about 2% by weight to 6% by weight of $TiO_2$. Additionally, the intermediate layers may also contain talc. The whiteness resulting from the inclusion of $TiO_2$ provides an excellent surface for graphics. Furthermore, the whiteness allows printing of laminated or unlaminated structures without requiring white ink.

Layers (d) and (e) are thin skin layers applied to the surfaces of intermediate layers (b) and (c) which are not in contact with the core layer (a). Layers (d) and (e) are preferably of a material having a low WVTR. This layer may consist of a propylene; high density polyethylene; linear low density polyethylene; block copolymer of ethylene and propylene; random copolymer of ethylene and propylene; other ethylene homopolymer, copolymer, terpolymer; or blends thereof. The homopolymer contemplated herein is formed by polymerizing the respective monomer. This can be accomplished by bulk or solution polymerization, as those skilled in the art would plainly understand. One of the preferred materials for layers (d) and (e) is isotactic polypropylene. Skin layers (d) and (e) are of a thickness sufficient to encapsulate the intermediate layers, and, when $TiO_2$ is employed in intermediate layers (b) and (c), the desired effect of reduced processing machinery wear problems associated with $TiO_2$-containing outer layers is achieved. Moreover, the combination of intermediate layer (b) and skin layer (d) and intermediate layer (c) and skin layer (e) provide a thickness such that the outer surface of each skin layer does not, at least substantially, manifest the surface irregularities of the matrix core layer (a).

The copolymer contemplated herein for skin layers (d) and/or (e) can be selected from those copolymers typically employed in the manufacture of multi-layered films. For example, a block copolymer of ethylene and propylene is formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from the preceding stage is sufficiently low to prevent formation of an excessive proportion of random copolymer. Also, as indicated above, a random copolymer of ethylene and propylene can be advantageously employed to form skin layers (d) and/or (e).

The contemplated terpolymers which may be used for skin layers (d) and/or (e) are comparatively low stereoregular polymers. The terpolymers can have a melt flow rate at 446° F. ranging from about 2 to about 10 grams per 10 minutes and preferably from about 4 to about 6 grams per 10 minutes. The crystalline melting point can range from about less than 250° F. to somewhat greater than 371° F. The terpolymers will predominate in propylene, and the ethylene and 1-butene monomers can be present in approximately from 0.3:1–1:1 mole percentage in relation to each other.

If desired, the exposed surface of skin layers (d) and/or (e) can be treated in a known and conventional manner, e.g., by corona discharge to improve its receptivity to printing inks and/or its suitability for such subsequent manufacturing operations as lamination.

The exposed treated or untreated surface of layers (d) and/or (e) may have applied to it, coating compositions or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbounded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

Layers (d) and/or (e) may also include up to about 1% by weight, with about 500 ppm to about 5000 ppm preferred and 1000 ppm most preferred, of inorganic particles, such as amorphous silica or talc to provide antiblock properties.

Skin layers (d) and/or (e) can also be fabricated from any of the heat sealable copolymers, blends of homopolymers and blends of copolymer(s) and homopolymer(s) heretofore employed for this purpose. Illustrative of heat sealable copolymers which can be used in the present invention are ethylene-propylene copolymers containing from about 1.5 to about 10, and preferably from about 3 to about 5 weight percent ethylene and ethylene-propylene-butene terpolymers containing from about 1 to about 10, and preferably from about 2 to about 6 weight percent ethylene and from about 30 to about 97, and preferably from about 88 to about 95 weight percent propylene. Heat sealable blends of homopolymer which can be utilized in providing layers (c) and/or (e) include from about 1 to about 99 weight percent polypropylene homopolymer, e.g., one which is the same as, or different from, the polypropylene homopolymer constituting core layer (a) blended with from about 99 to about 1 weight percent of a linear low density polyethylene (LDPE). If layers (d) and/or (e) are heat-sealable, corona or flame treatment of layers (d) and/or (e) is not required.

Heat sealable blends of copolymer(s) and homopolymer(s) suitable for providing layers (d) and/or (e) include: a blend of from about 5 to about 19 weight percent of polybutylene and from about 95 to about 81 weight percent of a copolymer of propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polybutylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

If skin layers (d) and/or (e) are not heat sealable, and that property is desired on one or both of those surfaces, then a heat sealable layer (f) may be applied to one or both of those surfaces. Heat sealable layer (f) may be, for example, vinylidene chloride polymer or an acrylic polymer; or it may be coextruded from any of the heat sealable materials described herein. Vinylidene chloride polymer or acrylic polymer coatings are preferred materials which may be applied to the exposed exterior surfaces of the skin layers.

It is preferred that all layers of the multi-layer film structures of the present invention be coextruded. Thereafter, the film is biaxially oriented. For example, when employing polypropylene for the core matrix and the skin layers and employing PBT as the void initiating particles, a machine direction orientation may be from about 3 to about 8 and a transverse orientation may be from 4 to about 10 times at a drawing temperature of about 100° C. to 170° C. to yield a biaxially oriented film. A preferred film thickness is from about 0.5 mil to about 3.5 mils.

Whiteness and opacity is created in the structures of the present invention by biaxially orienting first in the machine direction (MDO) and subsequently in the transverse direction (TDO). As indicated, in the orientation process the stretching force causes the thermoplastic polymer to part around the finely dispersed void-initiating particles and from oval shaped cavities or microvoids, supported by the particles. The whiteness and opacity of the resulting cavitated film depend on the following factors:

Polymer volume, i.e., polygage
Core and skin ratios
Core composition
The degree of cavitation as indicated by the film density g/cc as calculated by dividing the weight of one square meter by the optical gage ($\mu$)

The higher the cavitation, that is the lower the film density, a whiter and more opaque film results; the lower the degree of cavitation, the lower the whiteness and opacity. Yet another way to increase the opacity of the cavitated film is to add pigment opacifiers such as iron oxide, and as is more preferred, by using a lamellar structure pigment, such as lamellar graphite.

As indicated, some applications, such as VFFS packaging machines and some HFFS packaging machines require higher density films that will pass over the forming collars of the machine without damage due to film crazing or shearing of the package. It has been discovered that this can be achieved by reducing the cavitation. To retain the film's pleasing aesthetic appearance, reducing the cavitation requires reducing the pigment volume as well, which results in loss of opacity and an increase of light transmission. Loss of whiteness producing cavitation can be offset by the use of $TiO_2$ in the intermediate and/or skin layers of the structure each comprising 10% by weight of the total structure.

As indicated above, films which employ titanium dioxide-whitened outer skin layers do provide certain desirable benefits, particularly from an appearance standpoint. However, such films can also yield certain undesirable characteristics. These undesirable characteristics stem from the fact that titanium dioxide (TiO$_2$) is quite abrasive and, in fact, possess a hardness greater than even the chrome plating found on gravure rolls. This can result in excessive wear of expensive printing and coating gravure roll surfaces, as well as any other surface which is contacted by such a film. Other problems which arise from the use of TiO$_2$ in the outer skin layers of such films is that fine deposits are laid on converting machinery, extruder die lips, treater bar exhausts, etc. Also, appearance problems caused by streaks on the film, slippage on stretching either by roll or tentering can result.

The following specific examples are presented herein to illustrate particular embodiments of the present invention and hence are illustrative of this invention and not to be construed in a limiting sense.

EXAMPLE 1

The film of this example was produced for comparison with the films produced in the following examples.

A mixture of 92 percent, by weight, isotactic polypropylene (MP=320° F., melt index=3), containing 8 weight percent PBT (MP=440° F.) as the core layer void-initiating material, is melted in an extruder with a screw of L/D ratio of 20/1 to provide the core layer mixture. A second extruder, in association with the first extruder, is supplied with the same isotactic polypropylene as the first extruder, this extruder used to provide the sink (intermediate) layer mixture. A melt coextrusion is carried out while maintaining the cylinder of the core polymer material at a temperature sufficient to melt the polymer mixture, i.e., from about 450° F. to about 550° F. or higher. The polypropylene mixtures of the second extruder to be used to form the skin (intermediate) layers is maintained at about the same temperature as the polypropylene used in fabricating the core layer. The mixture of the second extruder is split into two streams to enable the formation of skin layers on each surface of the core layer. As may be appreciated by those skilled in the art, rather than splitting the output of the second extruder into two streams, a third extruder could be used to supply the second skin layer mixture. Such an arrangement would be desired when the material used to form the second skin layer is varied from that of the first skin layer, when the thickness of the second skin layer is varied from that of the first skin layer, etc.

A three-layer film laminate was coextruded with a core thickness representing about 80 percent of the overall extruded thickness, with the thicknesses of the skin layers representing about 20 percent of the film thickness. The resultant film sheet was subsequently oriented eight by five and three-quarter times using a commercially available sequential biaxially orienting apparatus to provide a multi-layer film structure. The machine direction (MD) orientation is conducted at about 285° F. and the transverse direction (TD) orientation is conducted at about 300° F. The resultant multi-layer film exhibits a lustrous, white appearance and the following properties.

| | |
|---|---|
| Optical gage (measured through microscope | 33 μm |
| Poly gage (Polypropylene equivalent) | 22.4 μm |
| Density | 0.62 g/cc |
| Light transmission | 22% |

The degree of cavitation is indicated by film density, in g/cc, as calculated by dividing the weight of one square meter of film by the optical gage (μm).

EXAMPLE 2

This example demonstrates the effect on light transmission when lamellar graphite is added to the core mixture.

A mixture of 90 percent, by weight, isotactic polypropylene (MP=320° F., melt index=3), containing 8 weight percent PBT (MP=440° F.), as the core layer void-initiating material, and 2 percent lamellar graphite, is melted in an extruder with a screw of L/D ratio of 20/1 to provide the core layer mixture. A second extruder, in association with the first extruder, is supplied with the same isotactic polypropylene as the first extruder and about 1500 ppm of a finely divided silica antiblocking agent, this extruder used to provide the skin (intermediate) layer mixture. A melt coextrusion is carried out while maintaining the cylinder of the core polymer material at a temperature sufficient to melt the polymer mixture, i.e., from about 450° F. to about 550° F. or higher. The polypropylene mixtures of the second extruder to be used to form the skin layers is maintained at about the same temperature as the polypropylene used in fabricating the core layer. The mixture of the second extruder is split into two streams to enable the formation of skin layers on each surface of the core layer.

A three-layer film laminate was coextruded with a core thickness again representing about 80 percent of the overall extruded thickness, with the thicknesses of the skin layers representing about 20 percent of the film thickness. The resultant film sheet was subsequently oriented eight by five and three-quarter times using a commercially available sequential biaxially orienting apparatus to provide a multi-layer film structure. The machine direction (MD) orientation is conducted at about 285° F. and the transverse direction (TD) orientation is conducted at about 300° F. The resultant multi-layer film exhibits a pleasing, silvery appearance, not unlike aluminum foil, but containing no metal additive. The properties of the film so produced were as follows.

| | |
|---|---|
| Optical gage | 35.5 μm |
| Poly gage | 22.3 μm |
| Density | 0.56 g/cc |
| Light transmission | 1.25% |

Additionally the film of this example provides a very high barrier in the visible to the ultra violet light range and is acceptable for use as a low density packaging material for processing on printing presses and packaging machines.

EXAMPLE 3

This example demonstrates the effect of reduced cavitation, achieved through a reduction in machine direction orientation, on film properties.

As in Example 2 a mixture of 90 percent, by weight, isotactic polypropylene (MP=320° F., melt index=3), containing 8 weight percent PBT (MP=440° F.), as the core layer void-initiating material, and 2 percent lamellar graphite, is melted in an extruder with a screw of L/D ratio of 20/1 to provide the core layer mixture. A second extruder, in association with the first extruder, is supplied with the same isotactic polypropylene as the first extruder and about 1500 ppm of a finely divided silica antiblocking agent, this extruder used to provide the skin (intermediate) layer mixture. A melt coextrusion is carried out under the same conditions as used in Example 2. Again, the mixture of the second extruder is split into two streams to enable the formation of skin layers on each surface of the core layer.

A three-layer film laminate was coextruded with a core thickness again representing about 80 percent of the overall extruded thickness, with the thicknesses of the skin layers representing about 20 percent of the film thickness. The resultant film sheet was subsequently oriented eight by about five and one-third times using a commercially available sequential biaxially orienting apparatus to provide a multi-layer film structure. The machine direction (MD) orientation is conducted at about 290° F. and the transverse direction (TD) orientation is conducted at about 300° F. The resultant multi-layer film exhibits an appearance which is darker, less attractive than the silvery appearance of the film of Example 2. this is due to the reduction in whiteness and opacity which results from the reduction in cavitation. Other properties of the film are as follows.

| Poly gage | 22.3 μm |
| Optical gage | 34 μm |
| Density | 0.62 g/cc |
| Light transmission | 2% |

EXAMPLE 4

This example demonstrates that the level of whiteness lost through reduced cavitation, can be recovered through the use of a whitening agent.

As in Examples 2 and 3, a mixture of 90 percent, by weight, isotactic polypropylene (MP=320° F., melt index=3), containing 8 weight percent PBT (MP=440° F.), as the core layer void-initiating material, and 2 percent lamellar graphite, is melted in an extruder with a screw of L/D ratio of 20/1 to provide the core layer mixture. A second extruder, in association with the first extruder, is supplied with the same isotactic polypropylene as the first extruder, to which is added 4 percent $TiO_2$, this extruder used to provide the skin (intermediate) layer mixture. A melt coextrusion is carried out under the same conditions as used in Example 2. Again, the mixture of the second extruder is split into two streams to enable the formation of skin layers on each surface of the core layer.

A three-layer film laminate was coextruded with a core thickness again representing about 80 percent of the overall extruded thickness, with the thicknesses of the skin layers representing about 20 percent of the film thickness. The resultant film sheet was subsequently oriented eight by about five and one-third times using a commercially available sequential biaxially orienting apparatus to provide a multi-layer film structure. The machine direction (MD) orientation is conducted at about 290° F. and the transverse direction (TD) orientation is conducted at about 300° F. The resultant multi-layer film exhibits a pleasing, silvery appearance, essentially equivalent to that of the film of Example 2, with a lighter appearance than the film of Example 2, and a much lighter appearance than the film of Example 3. The properties of the film so produced are as follows:

| Optical gage | 33 μm |
| Poly gage | 22.4 μm |
| Density | 0.62 g/cc |
| Light transmission | 2.2% |

EXAMPLE 5

The film of this example demonstrates the effect of adding encapsulating skin layers to the film structure of Example 4 to form a five-layer structure.

A mixture of 90 percent, by weight, isotactic polypropylene (MP=320° F., melt index=3), containing 8 weight percent PBT (MP=440° F.), as the core layer void-initiating material, and 2 percent lamellar graphite, is melted in an extruder with a screw of L/D ratio of 20/1 to provide the core layer mixture. A second and third extruder, in association with the first extruder, are each supplied with the same isotactic polypropylene (without PBT) as the first extruder, containing titanium dioxide particles at 4 percent, by weight for this intermediate layer mixture. A fourth extruder, in association with the first three extruders, is supplied with the same isotactic polypropylene, without titanium dioxide, to provide the skin layer mixture. A melt coextrusion is carried out while maintaining the cylinder of the core polymer material at a temperature sufficient to melt the polymer mixture, i.e., from about 450° F. to about 550° F. or higher. The polypropylene mixtures to be extruded as intermediate layers are maintained at about the same temperature as the polypropylene used in fabricating the core layer, as is the mixture being used for the skin layers. The mixture of the fourth extruder is split into two streams to enable the formation of skin layers on each surface of the intermediate layers.

A five-layer film laminate was coextruded with a core thickness representing about 75 percent of the overall extruded thickness, with the thicknesses of the intermediate layers representing about 20 percent and the skin layers representing about 5 percent of the film thickness. As in Example 4, the resultant film sheet was oriented eight by five and one-third times using a commercially available sequential biaxially orienting apparatus to provide a multi-layer film structure. The machine direction (MD) orientation is conducted at about 290° F. and the transverse direction (TD) orientation is conducted at about 300° F. The resultant multi-layer film exhibits a smooth and lustrous appearance and exhibits the following properties.

| Optical gage | 33 μm |
| Poly gage | 22.4 μm |
| Density | 0.62 g/cc |
| Light transmission | 2.2% |

EXAMPLE 6

This example demonstrates the effect of a yet further reduction in cavitation on film properties, again achieved through a reduction in machine direction orientation.

A five-layer film laminate, prepared in accordance with Example 5 was coextruded with a core thickness representing about 75 percent of the overall extruded thickness, with the thicknesses of the intermediate layers representing about 20 percent and the skin layers representing about 5 percent of the film thickness. For this Example, however, the resultant film sheet was oriented eight by four and three-quarter times using a commercially available sequential biaxially orienting apparatus to provide a multi-layer film structure. The machine direction (MD) orientation is conducted at about 295° F. and the transverse direction (TD) orientation is conducted at about 300° F. The resultant multi-layer film exhibits a smooth and lustrous appearance and exhibits the following properties.

| Optical gage | 31 μm |
| Polygage | 23.3 μm |
| Density | 0.7 g/cc |
| Light transmission | 3.8% |

EXAMPLE 6

The example demonstrates the effect of substituting a terpolymer for isotactic polypropylene to form the encapsulating skin layers of the multi-layer structure.

A mixture of 90 percent, by weight, isotactic polypropylene (MP=320° F., melt index=3), containing 8 weight percent PBT (MP=440° F.), as the core layer void-initiating material, is melted in an extruder with a screw of L/D ratio of 20/1 to provide the core layer mixture. The second and third extruders, in association with the first extruder, were supplied with the same isotactic polypropylene (without PBT) as the first extruder, containing titanium dioxide particles at 4 percent by weight for use in forming the intermediate layer. A fourth extruder, in association with the first three extruders, was provided with an ethylene, 1-butene, polypropylene terpolymer, instead of isotactic polypropylene, together with 1500 ppm of a finely divided silica antiblock agent. A melt coextrusion is carried out while maintaining the cylinder of the core polymer material at a temperature sufficient to melt the polymer mixture, i.e., from about 450° F. to about 550° F. or higher. Again, the polypropylene mixtures to be extruded as intermediate layers are maintained at about the same temperature as the polypropylene used in fabricating the core layer, as is the terpolymer mixture being used to form the skin layers. As in the previous Examples, the mixture of the fourth extruder is split into two streams each to enable the formation of skin layers on each surface of the intermediate layer.

A five-layer film laminate is coextruded with a core thickness representing about 75 percent of the overall extruded thickness, with the thicknesses of the intermediate layers representing about 20 percent and the skin layers representing about 5 percent of the film thickness. The resultant film sheet was subsequently oriented eight by four and three-quarter times using a commercially available sequential biaxially orienting apparatus to provide a multi-layer film structure. The machine direction (MD) orientation is conducted at about 295° F. and the transverse direction (TD) orientation is conducted at about 300° F. the resultant multi-layer film exhibits the same appearance as the film produced in Example 5, with somewhat lower gloss. Properties determined for the film are as follows.

| Optical gage | 30 μm |
| Polygage | 23 μm |
| Density | 0.71 g/cc |
| Light transmission | 4.0% |
| Coefficient of friction | 0.80 |

As indicated, the film of this example has a terpolymer skin with antiblock for reducing surface friction. This film is most suitable for coating after corona or flame treatment with a primer and subsequently with acrylic or polyvinylidene chloride to yield good machinability, sealability with good seal strength and hot tack properties.

EXAMPLE 7

This example demonstrates that the use of a migratory slip agent and a migratory antistatic agent in the intermediate layer blend reduces surface coefficient of friction characteristics.

A mixture of 90 percent, by weight, isotactic polypropylene (MP=320° F., melt index=3), containing 8 weight percent PBT (MP=440° F.) as the core layer void-initiating material and 2 percent lamellar graphite, is melted in an extruder with a screw of L/D ratio of 20/1 to provide the core layer mixture. (The lamellar graphite is again employed for its beneficial effect on reduced light transmission and overall film appearance). A second and third extruder, in association with the first extruder, are each supplied with the same isotactic polypropylene (without PBT) as the first extruder, but each containing titanium dioxide particles at 4 percent, about 1200 ppm of Armostat ® 410, an amine-based antistatic material, and about 1200 ppm of erucamide, by weight. A fourth extruder, in association with the first three extrudes, is supplied with the ethylene, 1-butene, polypropylene terpolymer of Example 6, together with 1500 ppm of a finely divided silica antiblock agent and without titanium dioxide particles, Armostat ® 410, and erucamide, this extruder being used to provide the skin layer mixture. A melt coextrusion is carried out while maintaining the cylinder of the core polymer material at a temperature sufficient to melt the polymer mixture, i.e., from about 450° F. to about 550° F., or higher. The polypropylene mixtures of the second and third extruders to be extruded as intermediate layers are maintained at about the same temperature as the polypropylene used in fabricating the core layer, as are the mixtures being used to for the skin layers. The mixture of the fourth extruder, again, is split into two streams to enable the formation of skin layers on each surface of the intermediate layers.

A five-layer film laminate was coextruded with a core thickness representing about 75 percent of the overall extruded thickness, with the thicknesses of the intermediate layers representing about 20 percent and the skin layers representing about 5 percent of the film thickness. The resultant film sheet was subsequently oriented eight by four and three-quarter times using a commercially available sequential biaxially orienting apparatus to provide a multi-layer film structure. The machine direction (MD) orientation is conducted at about 295° F. and the transverse direction (TD) orientation is conducted at about 300° F. the resultant multi-layer film exhibits the same appearance as the film of Example 6, with the following properties.

| | |
|---|---|
| Optical gage | 30 μm |
| Polygage | 23 μm |
| Density | 0.71 g/cc |
| Light transmission | 4.0% |
| Coefficient of friction | 0.35* |

*Measured after one week of aging to permit migration.

EXAMPLE 8

This example demonstrates that effect of an increase in film thickness on the properties of a multi-layer film similar to the film of Example 7 in other respects.

A five-layer film laminate, prepared in accordance with Example 7 was coextruded to achieve an overall thicker film, again with a core thickness representing about 75 percent of the overall extruded thickness, with the thicknesses of the intermediate layers representing about 20 percent and the skin layers representing about 5 percent of the film thickness. The resultant multi-layer film exhibited the following properties.

| | |
|---|---|
| Optical gage | 54 μm |
| Polygage | 38.5 μm |
| Density | 0.7 g/cc |
| Light transmission | 0.2% |

The coefficient of friction of this film is also about 0.35 after a week of storage for migration.

As may be appreciated by those skilled in the art, the above examples illustrate: the value of graphite added to a white cavitated core to produce a high opacity film; the effect of the degree of cavitation on opacity and film appearance; that reduced cavitation improves films machinability in HFFS and VFFS packaging machines and improves film handling and reduces the damage due to handling; that reduced cavitation makes white opaque film less opaque and graphite pigmented opaque film darker and unpleasant in appearance; that the addition of $TiO_2$ will offset the darkening effect to preserve the good appearance of the film; that adding copolymer outer skins in a five layer structure will improve the sealability of the film when coated with acrylic on PvDC and the "soft" EP copolymer or terpolymer layer will reduce the core to skin layer delamination and also improve hot tack; adding migratory slip and antistatic agents in the intermediate layers will produce migration to the surface and reduce COF to a level on the order of 0.35.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the amended claims.

What is claimed is:

1. An opaque, biaxially oriented polymer film structure, produced by orienting the film to a degree which provides low light transmission and improved machinability, comprising:

(a) a thermoplastic polymer matrix core layer having a first surface and a second surface, within which is located a strata of voids; positioned at least substantially within a substantial number of said voids is at least one spherical void-initiating particle which is phase distinct and incompatible with said matrix material, the void space occupied by said particle being substantially less than the volume of said void, with one generally cross-sectional dimension of said particle at least approximating a corresponding cross-sectional dimension of said void; the population of said voids in said core being such as to cause a significant degree of opacity, said core layer including a light absorbing pigment of lamellar morphology;

(b) a first non-voided thermoplastic polymer intermediate layer having a first surface and a second surface, said second surface of said first intermediate layer adhering to said first surface of said core layer; and (c) a second non-voided thermoplastic polymer intermediate layer having a first surface and a second surface, said second surface of said second intermediate layer adhering to said second surface of said core layer;

herein the level of light transmission of the film is less than 10% and the degree of orientation is about 8 TDO by less than about 5 MDO.

2. The film structure of claim 1, further comprising:

(d) a first non-voided thermoplastic skin layer adhering to said first surface of said first intermediate layer; and (e) a second non-voided thermoplastic skin layer adhering to said first surface of said second intermediate layer.

3. The film structure of claim 2, wherein said void-free skin contains an antiblocking agent.

4. The film structure of claim 1, wherein said core layer is fabricated from isotactic polypropylene.

5. The film structure of claim 4, wherein the void-initiating particles of said core layer comprise polybutylene terephthalate.

6. The film structure of claim 1, wherein said intermediate layers are fabricated from isotactic polypropylene.

7. The film structure of claim 2, wherein said skin layers are fabricated from isotactic polypropylene.

8. The film structure of claim 1, wherein at least one of said intermediate layers contain from about 2% to about 6% by weight of $TiO_2$.

9. The film structure of claim 2, wherein said skin layers are fabricated from a heat sealable material.

10. The film structure of claim 2, wherein said skin layers are fabricated from a material selected from the group consisting of homopolymer of propylene, linear low density polyethylene, high density polyethylene, random copolymer of propylene and ethylene, block copolymer of propylene and ethylene, copolymer of propylene and butylene, terpolymer of ethylene, propylene and butene, terpolymer of ethylene, propylene and butylene, and mixtures thereof.

11. The film structure of claim 2 wherein said skin layers are fabricated from an ethylene, 1-butene, propylene terpolymer.

12. A process for preparing an opaque, biaxially oriented polymeric film structure of low light transmission and improved machinability, comprising the steps of:

(a) mixing a major proportion of a first thermoplastic polymeric material with a minor proportion of a first material of higher melting point or having a higher glass transition temperature than the first thermoplastic polymeric material to produce a core layer mixture and a minor amount of a light absorbing pigment of lamellar morphology;

(b) heating the core layer mixture produced in step (a) to a temperature of at least above the melting point of the first thermoplastic polymeric material;

(c) dispersing the first material of higher melting point or higher glass transition temperature of the mixture produced in step (a) uniformly throughout the molten first thermoplastic polymeric material in the form of microspheres;

(d) mixing a second thermoplastic polymeric material to produce a first intermediate layer mixture;

(e) heating the intermediate layer mixture produced in step (d) to a temperature of about the melting point of the second thermoplastic polymeric material;

(f) mixing a third thermoplastic polymeric material to produce a second intermediate layer mixture;

(g) heating the second intermediate layer mixture produced in step (f) to a temperature of about the melting point of the second thermoplastic polymeric material; and (h) forming a biaxially oriented coextruded film structure from the core layer mixture, the first intermediate layer mixture and the second intermediate layer mixture, said forming step conducted at a temperature and to a degree to form a strata of opacifying voids within the core layer;

wherein the degree of orientation is about 8 TDO by less than about 5 MDO.

13. The process of claim 12, wherein prior to conducting said forming step, at least one thermoplastic skin layer mixture is produced for forming at least a first skin layer to encapsulate said first intermediate layer.

14. The process of claim 13, wherein a second thermoplastic skin layer mixture is produced for forming a second skin layer to encapsulate said second intermediate layer.

15. The process of claim 14, wherein said skin layer mixtures contains an antiblocking agent.

16. The process of claim 12, wherein said core layer mixture includes isotactic polypropylene.

17. The process of claim 16, wherein the void-initiating particles of said core layer comprise polybutylene terephthalate.

18. The process of claim 12, wherein said intermediate layer mixtures include isotactic polypropylene.

19. The process of claim 14, wherein said skin layer mixtures include isotactic polypropylene.

20. The process of claim 19, wherein said intermediate layer mixtures include from about 2 to about 6% by weight of $TiO_2$.

* * * * *

UNITED STATES PATENT AND TRADEMARK OFFICE
CERTIFICATE OF CORRECTION

PATENT NO. : 5,178,942

DATED : 1/12/93

INVENTOR(S) : Jean-Pierre Frognet et al.

It is certified that error appears in the above-identified patent and that said Letters Patent is hereby corrected as shown below:

Col. 20 Line 20  (Claim 1) "herein"  --wherein--

Signed and Sealed this

Ninth Day of November, 1993

*Attest:*

BRUCE LEHMAN

*Attesting Officer*   *Commissioner of Patents and Trademarks*